(12) United States Patent
Gaffney-Lovett et al.

(10) Patent No.: US 12,500,073 B2
(45) Date of Patent: Dec. 16, 2025

(54) METHOD OF CALIBRATING A MASS SPECTROMETER

(71) Applicant: Waters Technologies Ireland LTD, Dublin (IE)

(72) Inventors: Maria Gaffney-Lovett, Dublin (IE); Richard Denny, Dublin (IE)

(73) Assignee: Waters Technologies Ireland Limited, Dublin (IE)

( * ) Notice: Subject to any disclaimer, the term of this patent is extended or adjusted under 35 U.S.C. 154(b) by 424 days.

(21) Appl. No.: 18/032,702

(22) PCT Filed: Oct. 21, 2021

(86) PCT No.: PCT/EP2021/079162
§ 371 (c)(1),
(2) Date: Apr. 19, 2023

(87) PCT Pub. No.: WO2022/084428
PCT Pub. Date: Apr. 28, 2022

(65) Prior Publication Data
US 2023/0386811 A1    Nov. 30, 2023

(30) Foreign Application Priority Data

Oct. 21, 2020 (GB) ..................................... 2016687

(51) Int. Cl.
*H01J 49/00* (2006.01)
*H01J 49/42* (2006.01)

(52) U.S. Cl.
CPC ...... *H01J 49/0009* (2013.01); *H01J 49/0036* (2013.01); *H01J 49/42* (2013.01)

(58) Field of Classification Search
CPC .... H01J 49/0009; H01J 49/0036; H01J 49/42; H01J 49/0027
See application file for complete search history.

(56) References Cited

U.S. PATENT DOCUMENTS

| | | |
|---|---|---|
| 2005/0086017 A1 | 4/2005 | Wang |
| 2007/0023633 A1 | 2/2007 | Wang |

(Continued)

FOREIGN PATENT DOCUMENTS

WO    2018067772 A1    4/2018

OTHER PUBLICATIONS

ISR & WO issued in PCT Application No. PCT/EP2021/079162, mailed on Jan. 19, 2022, 14 pp.

(Continued)

*Primary Examiner* — David P Porta
*Assistant Examiner* — Mamadou Faye
(74) *Attorney, Agent, or Firm* — Goodwin Procter LLP (57) ABSTRACT

We provide a method of assessing an acquired mass spectrum, the method including the steps of: obtaining a model isotope pattern for a chemical compound of known elemental composition, providing mass spectrum data obtained from a mass spectrometer in analysis of the chemical compound, and performing location matching by comparing the mass spectrum data to the isotope pattern to match a reference location in the isotope pattern with respective corresponding candidate locations in the mass spectrum data, the location matching including: determining a likelihood function over the mass spectrum data, representing the likelihood that each location in the mass spectrum data correctly corresponds to the reference location of the isotope pattern, determining a set of candidate locations each corresponding to a local maxima in the determined likelihood function, and at each candidate location, determining an associated error bar based on the curvature of the likelihood function at that location.

13 Claims, 4 Drawing Sheets

(56) References Cited

U.S. PATENT DOCUMENTS

2016/0217986 A1* 7/2016 Denny ............... H01J 49/0036
2017/0138955 A1   5/2017 Anderson et al.

OTHER PUBLICATIONS

Search and Exam Report issued in GB2115061.0, issued on Apr. 8, 2022, 5 pp.
Kaur et al., "Algorithms for Automatic Interpretation of High Resolution Mass Spectra", Journal of the American Society for Mass Spectrometry, vol. 17, No. 3, 2006, p. 459-468.

* cited by examiner

METHOD OF CALIBRATING A MASS SPECTROMETER

CROSS-REFERENCE TO RELATED APPLICATIONS

This application is a U.S. national phase filing claiming the benefit of and priority to International Patent Application No. PCT/EP2021/079162, filed Oct. 21, 2021, which claims priority from and the benefit of GB Patent Application No. 2016687.2, filed Oct. 21, 2020. The entire contents of these applications are incorporated herein by reference.

DESCRIPTION OF INVENTION

This invention relates to a method of fitting data for calibrating a mass spectrometer, and more particularly to fitting data from a quadrupole mass spectrometer for the purpose of calibrating the spectrometer.

A quadrupole mass spectrometer (QMS) is a type of mass analyser used in the field of mass spectrometry. QMS provide advantages in terms of their relative simplicity and ease of operation, but yield a lower resolution than some mass spectrometer designs like time-of-flight (TOF) instruments.

Before use, a QMS is calibrated by establishing an output analysis of mass to charge ratio for a chemical compound having a known composition, for example, so that the 'correct' (i.e. expected) isotope pattern of charge to mass is known. The correct or known pattern is then compared to the pattern output by the QMS, to establish the extent of divergence between the positions of the peaks of the patterns. In this way, it can be established that the output of the QMS is of sufficient quality.

If the quality of mass peaks across a mass range is poor, it may indicate defects in the manufacture of the QMS or that it is not correctly tuned. On determining a misalignment or offset between the expected isotope pattern and the pattern produced by the QMS, the QMS may be adjusted so as to account for the offset so as to reduce or eliminate any offset. Alternatively, without adjusting the QMS itself, the data subsequently output using the QMS may be adjusted accordingly to reflect and/or address the known level of offset. In some cases, a mixture of these two approaches is adopted.

GB2405991A describes a generalised method of calibrating a mass spectrometer. US 2016/0217986 A1 describes a method of assessing mass spectral peaks.

The present invention seeks to alleviate or overcome one or more of the deficiencies associated with the prior art.

According to a first aspect of the invention we provide a method of assessing an acquired mass spectrum, the method including the steps of:
  obtaining a model isotope pattern for a chemical compound of known elemental composition,
  providing mass spectrum data obtained from a mass spectrometer in analysis of the chemical compound, and
  performing location matching by comparing the mass spectrum data to the isotope pattern to match a reference location in the isotope pattern with respective corresponding candidate locations in the mass spectrum data, the location matching including:
    determining a likelihood function over the mass spectrum data, representing the likelihood that each location in the mass spectrum data correctly corresponds to the reference location of the isotope pattern,
    determining a set of candidate locations each corresponding to a local maxima in the determined likelihood function, and
    at each candidate location, determining an associated error bar based on the curvature of the likelihood function at that location.

According to a second aspect of the invention we provide a method of assessing an acquired mass spectrum obtained by a quadrupole mass spectrometer, including the steps of:
  obtaining a model isotope pattern for a chemical compound of known elemental composition,
  providing mass spectrum data obtained from a quadrupole mass spectrometer in analysis of the chemical compound,
  obtaining an initial tolerance parameter and a target tolerance,
  performing location matching by comparing the mass spectrum data to the isotope pattern to match a reference location in the isotope pattern with a set of candidate locations in the mass spectrum data, determining the offset between the candidate locations and the reference location, and determining a subset of the candidate locations having an offset less than the tolerance parameter, and
  subsequently repeating the following steps until the tolerance parameter reaches the target tolerance:
    i) determining a calibrating function to fit the current subset of candidate locations,
    ii) fitting the calibrating function to the mass spectrum data and performing location matching by comparing the fitted function to the entire set of candidate locations, to determine the offset, and updating the current subset to include only those candidate locations having an offset less than the tolerance parameter, and
    iii) if the tolerance parameter is greater than the target tolerance, reducing the tolerance parameter.

According to a third aspect of the invention we provide a data processing system for assessing an acquired mass spectrum obtained by a mass spectrometer, the system comprising a processor configured to perform the steps of the methods of the first or second aspects of the invention.

Further features of the above aspects of the invention are described in the appended claims.

Embodiments of the invention will now be described, by way of example only, with reference to the following figures, of which.

With reference to the Figures, we describe the method of the invention, for assessing mass spectral data. Using the described method, a mass spectrometer may be calibrated through assessment to determine whether it has been tuned correctly and/or is subject to defects introduced in manufacturing, for example, and subsequently tuned if required.

A method is described whereby a model isotope pattern is determined for a chemical compound either of known elemental composition or of a known class of compositions (and preferably, for multiple such compounds). This composition may be particularly suitable for calibration at low mass, for example by including a 42 Da/e species within the composition. This isotope pattern is used as a model against which the accuracy of the QMS output is assessed. The isotope pattern may be generated multiple times for the respective multiple calibrant compounds in the acquired calibrant mix. The isotope pattern is convolved with a peak shape and the convolved pattern is used to find candidate locations in the acquired mass spectrum for a calibrant compound of interest (i.e. a candidate value of mass to charge).

This process is referred to as 'location matching', wherein a candidate location in the acquired mass spectrum data is considered as a match for a corresponding location (a 'reference location' or 'target location') in the model isotope pattern. In effect, this involves determining a correspondence between the features of the model isotope pattern and the acquired mass spectrum and determining the offset in alignment between the two patterns. In this way, the shape of the model isotope pattern and its position plotted on the domain of mass to charge ratio is compared to the acquired mass spectrum, in terms of its degree of correspondence, at various candidate locations in the domain to assess which of those candidate locations is most likely to provide the correct match. Theoretically the selected relative location of the reference point in the model isotope pattern and in the acquired mass spectrum data, to be used for comparison between the two datasets, does not matter so long as it is consistently applied. However, in practice the selected reference location is typically the maximum peak in the model isotope pattern, which naturally corresponds to the mono-isotopic mass to charge ratio value of the reference compound.

In calibration methods of the prior art, location matching is performed by choosing the most prominent peak of the acquired mass spectrum. It is possible that observed peaks are erroneously matched to reference masses where fragments or peaks arising from unexpected compounds are present, for example, which is exacerbated by high quadrupole scan rates and the resulting relative low resolution. In addition, noise from electronics or other external sources may affect the output data, so that the clarity of the output data is inhibited.

At high mass and high quadrupole scan rates, the isotope peaks in an isotope cluster are often not resolved (i.e. they may be indistinguishable). Seeking the mono-isotopic peak in such an unresolved cluster leads to inaccurate mass measurement. Furthermore, at high mass, where isotope peaks might be of comparable or greater size than the mono-isotopic peak, traditional peak-matching techniques often select a peak other than the mono-isotopic peak.

In the present method, candidate locations within the data of the acquired mass spectrum (i.e. peaks in the data that are to be compared as reference locations against the isotope pattern) are assigned. For each candidate location a likelihood of that positon matching the reference location in the isotope pattern is estimated. This is a measure of the correspondence between the model isotope pattern, with the acquired mass spectrum data, if the mass spectrum data was instead shifted so that the candidate location is aligned with the reference location in the model isotope pattern. Using those estimates, the candidate location having the highest associated likelihood of providing the 'correct' match between the model isotope pattern and the acquired mass spectrum data is ultimately determined. Furthermore, for each candidate location, an error bar is established representing the precision of that candidate location.

The error bar provides an indication of whether the candidate location has a high probability of being accurate, or alternatively whether there is some degree of uncertainty about the position. A smaller/narrower error bar indicates a higher degree of precision.

From this data a calibration curve may be produced, indicating a required adjustment to the QMS output across the mass spectrum.

In effect, this approach means that the calibration process takes account of these indications of candidate location precision on the measured uncalibrated masses.

Where analysing low mass, fragments and other peaks are present which can lead to spurious candidate locations. These can be filtered out by an adaptive peak-matching scheme as described which can accommodate significant non-linearity.

Figure 5:
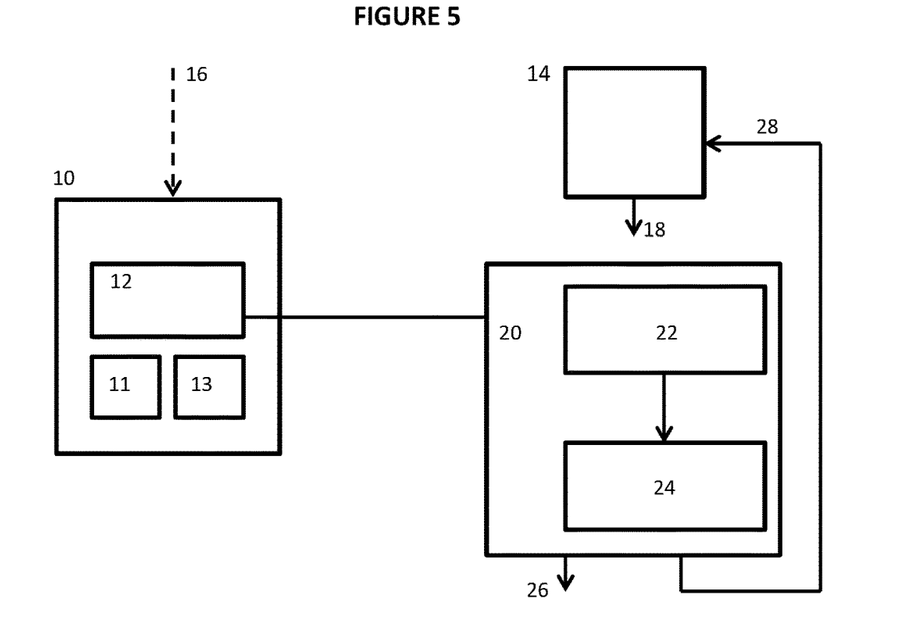
FIGS. 5 and 6 are flow diagrams illustrating methods according to aspects of the invention.

With reference to FIG. 5 of the drawings, a system for data analysis 10 is shown, providing a processor 12 configured to carry out steps of the method of assessing peaks of an acquired mass spectrum. The processor 12 is communicatively coupled with a storage device 13 (which may be local or remote) and a memory device 11, for handling and storing data used in the computations and processes described. The method includes the broad steps of obtaining a model isotope pattern 16 for a chemical compound of known elemental composition, and providing mass spectrum data obtained 18 from a mass spectrometer 14 (such as a quadrupole mass spectrometer) in analysis of the chemical compound. The method involves performing location matching (indicated at 20) between reference locations in the obtained model isotope pattern and candidate locations in the mass spectrum data. The system 10 may obtain the isotope pattern from an external source, or may obtain the data required to produce the isotope pattern from an external source, for example. Alternatively, the data may be stored within the system 10. The location matching process broadly involves comparing the graph representing the mass spectrum data to the modelled isotope pattern to match a reference mass to charge ratio (referred to herein as a reference location) in the isotope pattern with a respective corresponding candidate location in the mass spectrum data.

In this setting location matching involves determining a likelihood function (indicated at 22) over the mass spectrum data, wherein the likelihood corresponds to each location matching the reference location in the isotope pattern. Log-likelihood values associated with each position in the acquired data matching the reference location in the model isotope pattern are determined. Candidate locations are then determined based on local maxima in the likelihood function, representing a set of potential locations at which the reference location might provide a best match. Using interpolation across the peaks of the likelihood maxima, and assessing the curvature of that curve at each candidate location provides an error-bar value associated with that candidate location. A narrow peak having a steep log-likelihood curve indicates a relatively high precision of the candidate location being accurate, whereas a relatively smooth peak in log-likelihood indicates a lower precision around the candidate location; represented by a smaller error bar and a larger error bar, respectively.

The offset between the locations of the (or each) candidate location with its respective target location of the isotope pattern provides a value of mass to charge calibration adjustment, at that location in the domain, for use in determining a calibrating function. The error bar associated with each candidate peak is used during the calibration process to indicate flexibility over the positioning of the peak.

The method for determining the error bars, described herein, uses interpolation of the log-likelihood values associated with locations occurring close to (i.e. within a prescribed distance of) the maximum sampled log-likelihood value to establish the 'best' candidate location. The 'best' candidate location is the one determined to be most likely to match the reference location in the model isotope pattern. The locations are matched to reference mass to charge ratios using the iterative scheme described, so that we end up with at most one candidate location per reference compound. The offsets between these best candidate locations and the reference locations of the model isotope patterns may then be used in the process of obtaining a calibrating function to use in performing calibration on the QMS.

The error-bars (i.e. representing the determined precision in peak location) are evaluated using the curvature of the interpolating curve at the local maxima in log-likelihood. In order to provide reasonable estimates of the error-bars, the variance associated with each data point used in evaluating the log-likelihood is marginalised over to allow for unknown contributions to the noise in the data.

Isotope patterns for the calibrant compounds may be generated either using the known elemental composition (along with a suitable library of isotope masses and abundances) of the ions generated by the mass spectrometer. Alternatively, a representative pattern may be generated, for example, by a Poisson approximation, such that the rate of excess neutrons increases in proportion to monoisotopic mass.

Many different peak shape models (i.e. for fitting an appropriate curve associating charge to mass ratio against intensity, based on data observations) are available. For example, such an appropriate model is one in which a finite support approximation to a Gaussian is convolved with a quadratic. Adjusting the ratio of the widths of the pseudo-Gaussian and the quadratic, results in peak shapes that are suitable both for modelling low masses (having high quadratic width, and low pseudo-Gaussian width) and high masses (low quadratic width, with high pseudo-Gaussian width), as is known to the person skilled in this field.

Rather than mixing the Gaussian approximation with a quadratic, instead, an alternative peak shape model that may be used is by convolving the Gaussian approximation with a top-hat function (i.e. a rectangular function). A suitable function can be determined in an initial instrument setup procedure preceding calibration (known as 'Resolution setup'). The top-hat peak shapes (i.e. the widths of the peak of the rectangular function) may be used during this initial setup in order to determine accurate peak widths, given that the peak width of a rectangular function is very clearly defined. Such functions formed by convolving a Gaussian approximation with a top-hat function may also be used during the calibration steps as described herein.

Isotope Pattern Location

Before calibration, there may be a number of plausible locations for a calibrant isotope cluster, particularly at low mass. The purpose of isotope pattern location is to find these plausible locations to present to the cluster matching algorithm which will select one or none of them. An outline of the peak detection procedure is shown in FIG. 1.

Figure 1:
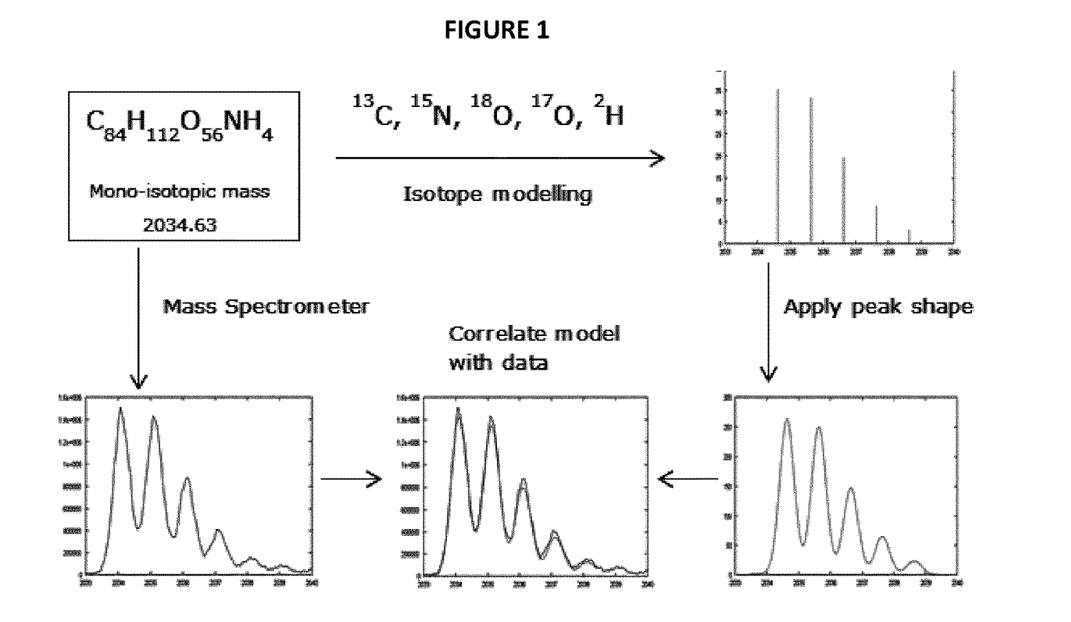
FIG. 1 is a diagrammatic illustration of the steps of modelling and locating the isotope cluster of a calibrant compound.

FIG. 1 is a diagrammatic illustration of the steps of modelling and locating the isotope cluster of a calibrant compound. The chemical formula of a compound, along with a library of isotope masses and abundances, is used to generate an isotope pattern for the compound. This pattern is then convolved with an appropriate peak shape to produce a model which can be located in the data.

The region in which a calibrant isotope cluster might be found is examined with the following procedure.

Step 1. The log-likelihood of the isotope cluster being located at a particular location is calculated at each sampling location in the range.

Step 2. The maxima in log-likelihood are located by interpolation (which also yields an error-bar in the location, based on the curvature at of the determined log-likelihood curve at each maxima).

Step 3. A log-likelihood is calculated for the range containing only background.

Step 4. The low probability maxima found in step 2 are pruned from the list.

When determining the likelihood of the peaks matching the various mass to charge ratio values observed, firstly, the noise in the spectrum is assumed to be related to Poisson statistics and a gain value is estimated, relating detector response to the number of ions. One way to achieve this is to use a Gaussian approximation to Poisson statistics. Poisson statistics has the property that the variance is equal to the mean, and so the error increases with intensity. We can transform to reduce or remove this variation (approximately) by taking the square root of the intensities and then estimating the properties of Gaussian white noise in the values. This can be achieved by taking successive differences in the data points, thereby removing smooth variations of increasing order. Quantiles corresponding to $\pm\sigma/2$ for a Gaussian can then be found from the remaining values. The difference between these two values must be scaled down to provide an estimate of $\sigma$ in the square root intensity data as each pass of differencing amplifies the noise. Finally, to arrive at the Poisson gain (the constant of proportionality relating ions to intensity), the estimated value of $\sigma$ must be squared and multiplied by four to account for the change in variable in returning from square root intensity to intensity.

A priori, the height or area of the isotope cluster is not known. Using the total area of the cluster we might define a uniform prior probability from zero up to a finite upper limit, A. These ranges should be wide enough such that the integrals performed over $(-\infty, +\infty)$ are good approximations to the more awkward integrals over the actual finite range. If we consistently use the same prior range for the area when comparing models, then the actual range need not appear in our implementation of the analysis.

If we denote our current model (i.e. the isotope cluster at a particular position) as a list of I heights, $f_i$, for data points $d_i$ with error bars $\sigma_i$ in the data range, the likelihood for the location is $$Pr(\{d_i\} \mid \{f_i\}, \{\sigma_i\}, A) = A^{-1} \int_0^\infty \prod_{i=1}^{I} (2\pi\sigma_i^2)^{-\frac{1}{2}} \exp\left[-\frac{1}{2}\frac{(\alpha f_i - d_i)^2}{\sigma_i^2}\right] d\alpha$$

which is approximated by $$A^{-1}\left[\prod_{i=1}^{I}(2\pi\sigma_i^2)^{-\frac{1}{2}}\right]\int_{-\infty}^{\infty} \exp\left[\sum_{i=1}^{I}-\frac{1}{2}\frac{(\alpha f_i - d_i)^2}{\sigma_i^2}\right]d\alpha =$$

$$A^{-1}\left[\prod_{i=1}^{I}(2\pi\sigma_i^2)^{-\frac{1}{2}}\right]\left(\frac{2\pi}{S_{ff}}\right)^{\frac{1}{2}}\exp\left[-\frac{1}{2}\left(S_{dd}-\frac{S_{fd}^2}{S_{ff}}\right)\right],$$

where $$S_{dd} = \sum_{i=1}^{I}\frac{d_i^2}{\sigma_i^2},\ S_{fd} = \sum_{i=1}^{I}\frac{f_i d_i}{\sigma_i^2},\ S_{ff} = \sum_{i=1}^{I}\frac{f_i^2}{\sigma_i^2}.$$

As the peak shape may not have been modelled entirely accurately, or for other reasons involving model inaccuracy, we may wish to "soften" the likelihood by assuming that the Poisson gain estimate was a lower limit and that the gain should be scaled by a factor $\kappa \geq 1$ with a prior probability distribution, $$Pr(\kappa|p>1) = (p-1)k^{-p}.$$

For example, with p=2, we may integrate $\kappa$ out to give $$Pr(\{d_i\}|\{f_i\},\{\sigma_i\},A,p=2) =$$

$$A^{-1}\left[\prod_{i=1}^{I}(2\pi\sigma_i^2)^{-\frac{1}{2}}\right]\left(\frac{2\pi}{S_{ff}}\right)^{\frac{1}{2}}\int_1^\infty \kappa^{-I-1}\exp\left[-\frac{\chi^2}{2\kappa^2}\right]d\kappa =$$

$$\frac{1}{2}A^{-1}\left[\prod_{i=1}^{I}(2\pi\sigma_i^2)^{-\frac{1}{2}}\right]\left(\frac{2\pi}{S_{ff}}\right)^{\frac{1}{2}}\left(\frac{\chi^2}{2}\right)^{-I/2}\gamma\left(\frac{I}{2},\frac{\chi^2}{2}\right),$$

where $$\chi^2 = S_{dd} - \frac{S_{fd}^2}{S_{ff}}$$

and $\gamma(a,z)$ is the incomplete gamma function (i.e. a generalisation of the complete gamma function $\gamma(a)$. In the extreme case where $X^2=0$ we can evaluate the likelihood as $$Pr(\{d_i\}|\{f_i\},\{\sigma_i\},A,p=2) = I^{-1}A^{-1}\left[\prod_{i=1}^{I}(2\pi\sigma_i^2)^{-\frac{1}{2}}\right]\left(\frac{2\pi}{S_{ff}}\right)^{\frac{1}{2}}.$$

This approach is taken, rather than having a Cauchy or Student's t-distribution on each data point, as the model is that there is a single unknown gain governing the response of the detector to the incoming ions.

Figure 2:
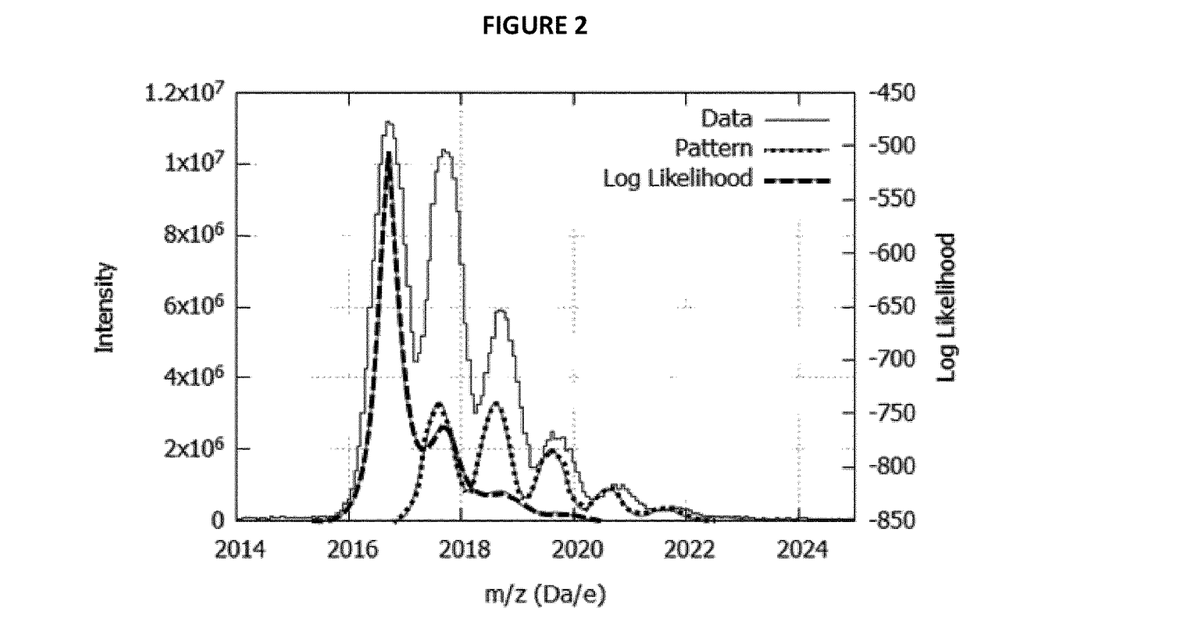
FIG. 2 is a graphical representation of locating an isotope cluster using the likelihood calculation.

FIG. 2 is a graphical representation of locating an isotope cluster using the likelihood calculation. The graph shows uncalibrated data plotted against the isotope pattern (on an arbitrary scale but placed as if the m/z axis were calibrated), and the log likelihood associated with the highest intensity peak of the isotope pattern matching each location (i.e. each mass to charge value). Note that the y-axis labels for the log likelihood are set out on the right of the graph.

FIG. 2 also shows a plot of the log likelihood of the position of the isotope cluster against the uncalibrated m/z axis. In this case, a generic isotope pattern was generated for a peptide of the same mass as the reference compound. Plausibly, the maximum likelihood location has selected a point in the highest bin of the mono-isotopic peak in the data and the next highest subsidiary maximum in the likelihood is less than $e^{-250}$ times as high as the principal maximum. The error-bar in the location of the isotope cluster is approximately 0.008 Da/e.

It should be understood that while certain functions for modelling likelihood and noise estimation have been described, alternative functions will be known to the skilled person in this field and it is contemplated that alternative functions to those described may be used. The use of the log-likelihood function, for example, is one suitable method of assessing the likelihood in this setting but other suitable functions may alternatively be used.

Pruning the List of Candidate Matches

In the region around a reference m/z more than one peak or isotope cluster may be present in the calibration data. It is also possible that there is no plausible isotope cluster in the region. The approach taken is to calculate a likelihood for a "background" model (which could be as simple as a constant level) and then to approximate the evidence for the presence of an isotope cluster by the Laplace approximation, $$Pr(\text{data} \mid \text{isotope cluster}) = \sum_{k \in maxima} \frac{L_k}{R}\sqrt{2\pi\sigma_k^2},$$

where $L_k$ is the likelihood at the $k^{th}$ maximum, R is the size of the region and $\sigma_k$ is the error-bar associated with the $k^{th}$ maximum (the $R^{-1}$ term is a uniform prior on the location of the cluster within the region). In total, the evidence is then $$Pr(\text{data} \mid \text{background or isotope cluster}) = (1-q)L_0 + q\sum_{k \in maxima}\frac{L_k}{R}\sqrt{2\pi\sigma_k^2},$$

where q is the prior probability of the presence of an isotope cluster in the region and $L_0$ is the likelihood associated with the background model. The labels k can be chosen so that maxima are ranked in terms of their contribution to the evidence so that once, for example, 99.9% of the evidence has been accumulated any remaining maxima may be discarded. This approach does assume that the correct match is often the strongest or not much weaker than the strongest feature in the region.

In this way, candidate locations are discarded by ordering the candidate locations in terms of the assessed posterior probabilities of matching the corresponding reference location of the isotope pattern. The posterior probabilities are determined as set out above, using a Laplace approximation based on the log-likelihood maxima and error-bars as previously calculated. Candidate locations are retained from those having the highest assessed posterior probability to the lowest (i.e. in order of the information they are assessed to provide as calculated in the previous step), until reaching a predetermined combined probability (e.g. of at least 0.95, or preferably at least 0.97, or more preferably still at least 0.99). Those candidate locations not contributing to that total are then discarded from the current set of matches being considered.

Figure 3:
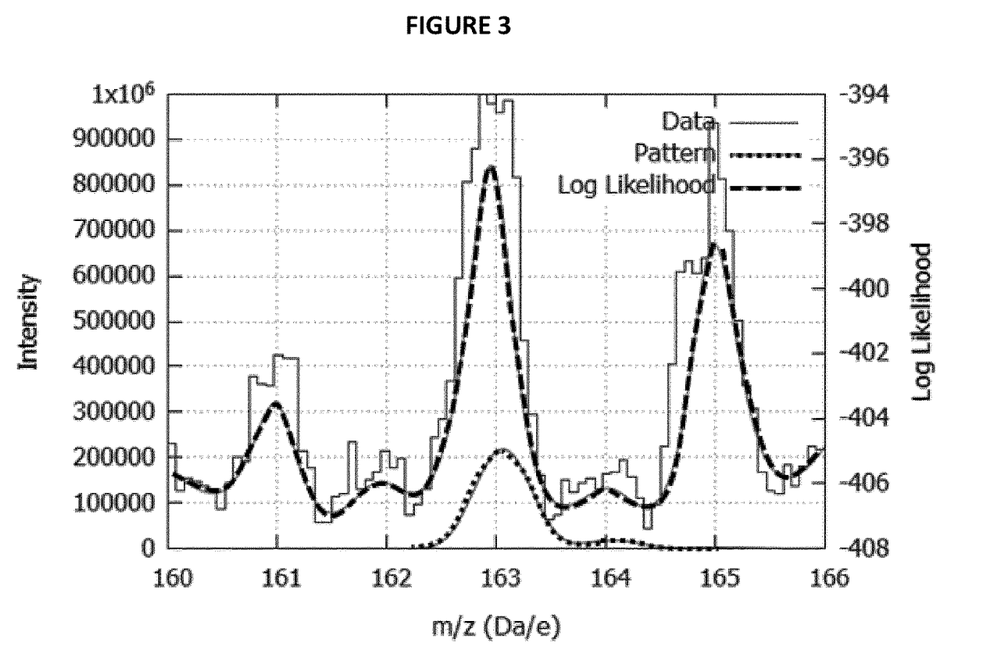
FIG. 3 is a similar graphical representation to FIG. 2, illustrating the location of a low mass isotope cluster.

FIG. 3 shows a typical situation at lower mass. In this example the largest peak of the reference compound is used as the reference location. There are multiple maxima and, although the strongest peak in the spectrum is expected to match the reference location, three locations appear plausible. In this example the probabilities of the cluster presence at the three highest maxima of the log likelihood, moving from left to right, are 0.001, 0.902 and 0.097, respectively. The model isotope pattern is again illustrated on an arbitrary scale, as was the case with FIG. 2.

Finding the Best Set of Matches

The method according to an aspect of the invention therefore includes the following broad steps.

At first, we select an initial tolerance for matching candidate locations to reference locations in the first instance (e.g. 4 Da/e in uncalibrated m/z), and a target tolerance (which is relatively narrower; e.g. 0.5 Da/e).

A set of potential candidate locations is established based on the local maxima in the likelihood function. We then match location of the acquired mass spectrum to the reference location (i.e. typically the largest peak of the isotope pattern), and discard any candidate locations lying outside the initial tolerance window (i.e. those locations lying further from the reference location than the selected tolerance). To achieve this, a subset of candidate locations is maintained (which may alter each iteration), as candidate locations are discarded from it as they fail to fall within the required tolerance parameter. If more than one candidate location of the isotope pattern is within tolerance for a particular reference location, we select the candidate location with the highest intensity (i.e. assessed likelihood) as being the one that 'matches'.

We then select a low order calibrating function such as a quadratic function.

In embodiments, a set of two or more quadratic functions may be used as the calibrating function, to address potential inaccuracies found at low mass associated with using a single function across the whole range. In embodiments, two functions may be used—one for m/z values above a certain threshold, and one for m/z values below that threshold. For example, for candidate locations having m/z values of up to and including that of Leucine Enkephalin at around 556.3, a first quadratic function may be used. For candidate locations having m/z values above that, a second quadratic function is used.

The following iterative process is then followed:
1. Fit the calibrating function to each matched candidate location (within the current subset) using an error-tolerant likelihood function.
2. Perform location matching by discarding (for the purpose of this iteration only) any candidate locations more than the (current) tolerance away from the function obtained in step 1; if more than one candidate location is within tolerance for a particular reference location, select the one with the highest intensity. To achieve this, the "current" subset of candidate locations is updated so as to include only those falling within the defined tolerance.
3. Reduce the tolerance by some factor (e.g. 2), and repeat the process.

The above steps are repeated, each time lowering the tolerance in step 3, until the target tolerance has been reached and steps 1 and 2 carried out using that target tolerance level to perform location matching.

In relation to step 1, suitable error-tolerant likelihood functions are a Cauchy or a Laplace function, for example.

It should be noted that it is also possible for a candidate location to be discarded during an iteration if it lies outside the current tolerance of the target location, and yet due to a modification of the calibrating function, it may yet lie within the updated tolerance at a later step of the process. In that case the candidate location is once again considered, so long as it lies within the given tolerance during that iteration.

In other words, we first perform location-matching between the acquired mass spectrum data, comparing that data to the known isotope pattern. We perform location-matching on that data according to the initial tolerance that has been selected, rejecting candidate locations falling outside that tolerance 'window'.

The matched locations are then considered across the spectrum of m/z, and the discrepancy in m/z (i.e. the determined offset from the true position based on the isotope pattern) is determined for each matched location. The calibrating function is then fitted, to the locations across the m/z domain, to model the discrepancy established at each location. Using the determined calibrating function, we subsequently perform location matching based on the function that has been obtained. Candidates lying outside the tolerance window at each location are discarded once again. The tolerance is then reduced, and the steps repeated, so that the set of candidates is refined.

During this process, locations that are matched beyond a given tolerance—and now lie outside of the defined tolerance—are treated as outliers. These values are ignored, effectively, for the current iteration when determining a calibrating function. As noted above, it is possible that as the function is refined over subsequent iterations, a location previously considered to be an outlier might once again become relevant—and used in the set of candidate locations, so that it is once again taken into account. At each iteration, once the desired tolerance has been achieved, the locations considered at that point to be outliers, which are most likely to be erroneous matches, are ignored when fitting the calibrating function. In this way, the effect of outliers on the resulting calibrating function is significantly reduced.

Figure 4:
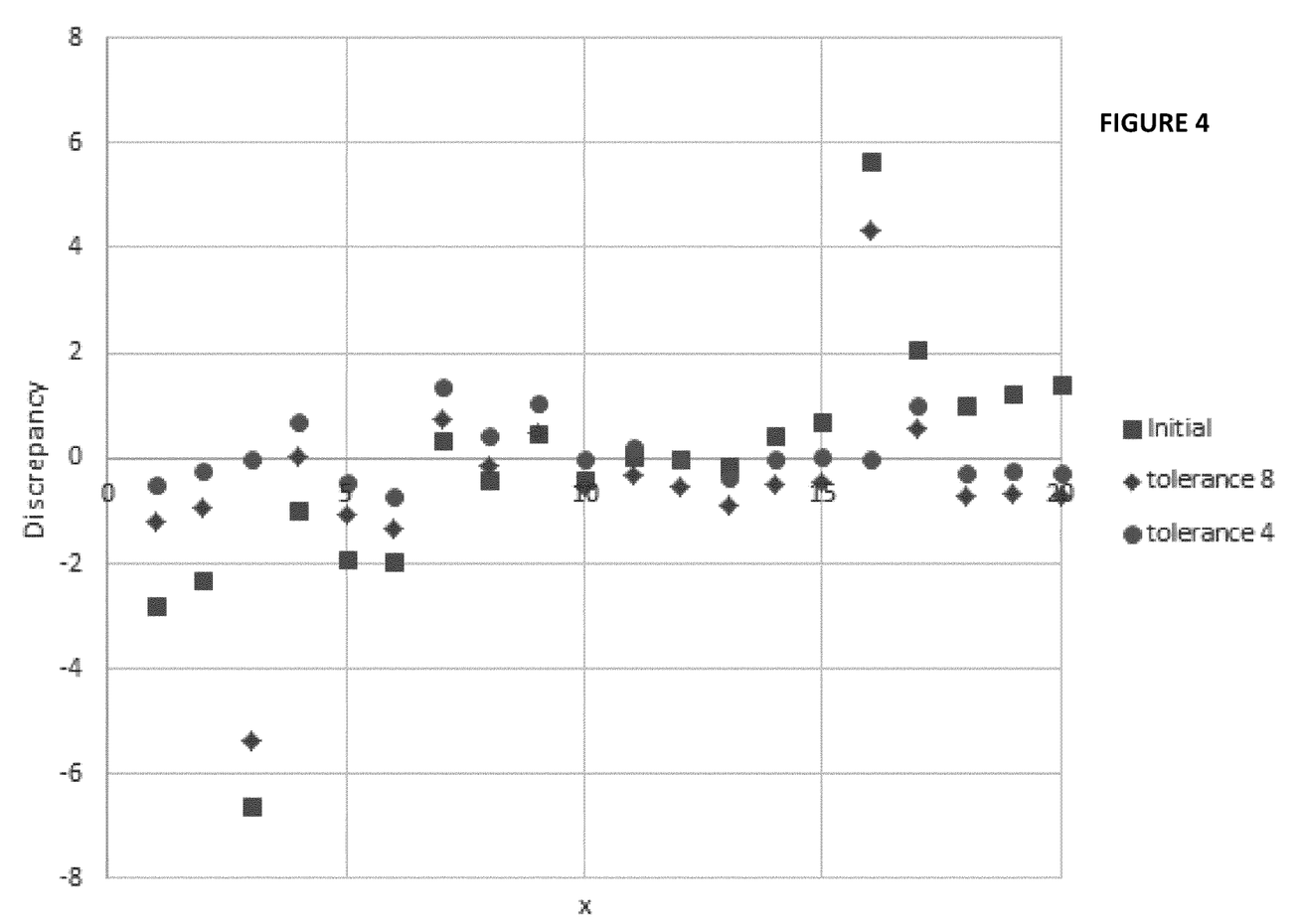
FIG. 4 is a graphical illustration of the process involved in adaptively rejecting locations from the calibration data—referred to as "adaptive location matching"

FIG. 4 illustrates graphically this process of adaptively rejecting candidate locations from the calibration data. The x axis of the graph reflects an arbitrary scale, or discrete candidate locations, in terms of the relative mass to charge ratio of those respective locations. The squares represent the discrepancies of the observed locations of the calibration data from their true values according to the initial calibration. A tolerance of eight units is applied which retains all the candidates and the error tolerant fit is performed leading to the discrepancies indicated by the diamonds. In the example shown, the tolerance is reduced to 4 units, resulting in the points at 3 and 16 (x-axis values) being rejected as outliers, leading to the discrepancies for the error tolerant fit shown by the circles. Note that the discrepancy in locations 3 and 16, where the candidate locations were determined to be outliers, have been discarded and reset as zero.

Figure 6:
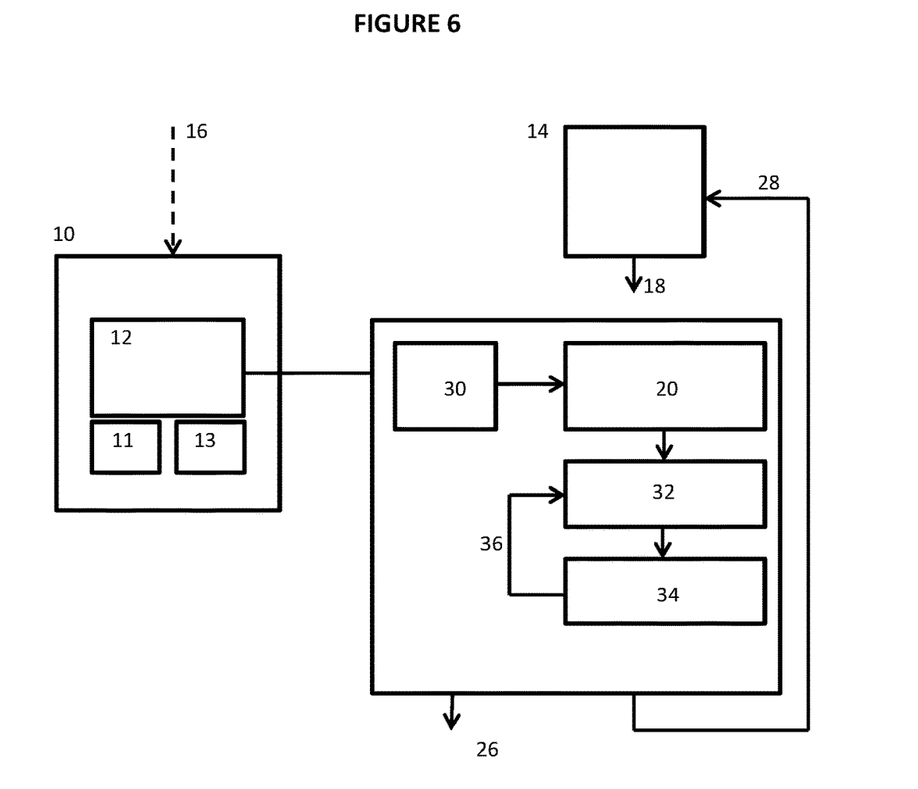

In broad terms this aspect of the method for assessing peaks in the data output from a quadrupole mass spectrometer involves first obtaining (16) a model isotope pattern for a chemical compound of known elemental composition, and mass spectrum data obtained (18) from a quadrupole mass spectrometer (14) in analysis of that chemical compound. An Initial tolerance parameter and target tolerance parameters are obtained (indicated at 30)—either via user input to the system 10 for example, or values that have been predetermined and stored.

In this context location matching 20 is performed by comparing the mass spectrum data to the isotope pattern to match a plurality of locations in the isotope pattern with respective corresponding candidate peaks in the mass spectrum data. The tolerance parameter reflects the largest tolerated offset between peaks in the data-sets, when considering candidate matches for pairing up corresponding peaks during the location matching process. The initial value is that used at the start of the process, and subsequently that value is reduced—so as to narrow the tolerance applied when pruning potential candidate locations—until the target tolerance is reached at which point the data is considered to have reached the desired accuracy. The offset between the locations of the matched locations is determined, and candidate locations having an offset greater than the tolerance parameter are discarded from consideration during that iteration.

Subsequently, the following steps are repeated until the tolerance parameter reaches the target tolerance.

We determine a calibrating function (indicated at 32) to fit the matched candidate locations, preferably using a quadratic function. The calibrating function is based on the determined offsets between the matched locations across the domain. Applying the calibrating function to subsequently produced data, or adjusting the spectrometer on that basis, results in the output values being realigned on the basis of the determined offsets. As mentioned previously, the calibrating function may be selected from a set of suitable quadratic functions, according to the m/z values of the candidate locations being matched.

We then compare the calibrating function to the candidate locations once again (indicated at 34) and again discard candidate locations from the data where the offset lies outside the chosen tolerance.

Finally, if the tolerance parameter has not yet reached the target tolerance (i.e. it is still higher than the target tolerance), we reduce the tolerance parameter (indicated at 36). Typically, the tolerance parameter is reduced by a predetermined factor (e.g. a factor of 2), but the reduction may alternatively be selected via user input or according to a predetermined sequence of factors or values selected in advance of the process.

In each iterative step of this process, the set of candidate locations is refined. At the end of this process, once the target tolerance has been reached, the current set of candidate locations may be output (indicated at 26) for use in a process of calibrating a quadrupole mass spectrometer, or for use in adjusting the output of a quadrupole mass spectrometer. Alternatively, the method may include a further step of actively calibrating the quadrupole spectrometer (indicated at 28) on the basis of the determined calibrating function.

Candidate locations that are output preferably include error bar data as described herein.

A data processing system 10 for assessing peaks of an acquired mass spectrum obtained by a mass spectrometer 14 may be operated according the methods described herein. The data processing system 10 comprises a processor 12 (in addition to other standard system components such as a memory device 11 and storage device 13, not described in detail herein) configured to perform the steps of the methods as outlined.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. A method of assessing an acquired mass spectrum, the method including the steps of:
    obtaining a model isotope pattern for a chemical compound of known elemental composition,
    providing mass spectrum data obtained from a mass spectrometer in analysis of the chemical compound, and
    performing location matching by comparing the mass spectrum data to the isotope pattern to match a reference location in the isotope pattern with respective corresponding candidate locations in the mass spectrum data, the location matching including:
        determining a likelihood function over the mass spectrum data, representing the likelihood that each location in the mass spectrum data correctly corresponds to the reference location of the isotope pattern,
        determining a set of candidate locations each corresponding to a local maxima in the determined likelihood function, and
        at each candidate location, determining an associated error bar based on the curvature of the likelihood function at that location.

2. A method according to claim 1, wherein determining an associated error bar includes assessing the variance associated with the mass spectrum data at each candidate location so as to account for noise in the data.

3. A method of assessing an acquired mass spectrum obtained by a quadrupole mass spectrometer, including the steps of:
    obtaining a model isotope pattern for a chemical compound of known elemental composition,
    providing mass spectrum data obtained from a quadrupole mass spectrometer in analysis of the chemical compound,
    obtaining an initial tolerance parameter and a target tolerance,
    performing location matching by comparing the mass spectrum data to the isotope pattern to match a reference location in the isotope pattern with a set of candidate locations in the mass spectrum data, determining the offset between the candidate locations and the reference location, and determining a subset of the candidate locations having an offset less than the tolerance parameter, and
    subsequently repeating the following steps until the tolerance parameter reaches the target tolerance:
        i) determining a calibrating function to fit the current subset of candidate locations,
        ii) fitting the calibrating function to the mass spectrum data and performing location matching by comparing the fitted function to the entire set of candidate locations, to determine the offset, and updating the current subset to include only those candidate locations having an offset less than the tolerance parameter, and
        iii) if the tolerance parameter is greater than the target tolerance, reducing the tolerance parameter.

4. A method according to claim 3 wherein reducing the tolerance parameter involves reducing the tolerance parameter by a predetermined factor in each iteration.

5. A method according to claim 3, wherein the calibrating function is a quadratic function.

6. A method according to claim 3, wherein the calibrating function is selected from a set of quadratic functions, according to the mass to charge values of the candidate locations being matched.

7. A method according to claim 3 wherein performing location matching includes:

determining a likelihood function over the mass spectrum data, representing the likelihood that each location in the mass spectrum data correctly corresponds to the reference location of the isotope pattern, determining the set of candidate locations each corresponding to a local maxima in the determined likelihood function, and at each candidate location, determining an associated error bar based on the curvature of the likelihood function at that location.

8. A method according to claim 3, wherein the method further includes outputting the current subset of the candidate locations once the target tolerance has been reached.

9. A method of calibrating a quadrupole mass spectrometer, including performing the steps of claim 3, and subsequently calibrating the spectrometer using the subset of candidate locations.

10. A method of calibrating a quadrupole mass spectrometer, including performing the steps of claim 3, including outputting a calibrating function based on the subset of candidate positions.

11. A method according to claim 1, wherein obtaining a model isotope pattern includes obtaining multiple isotope patterns for multiple chemical compounds of known elemental compositions, and providing mass spectrum data includes obtaining data from the mass spectrometer in analysis of the multiple chemical compounds.

12. A method according to claim 1, in which the target location in the isotope pattern corresponds with the position of a peak in the isotope pattern.

13. A data processing system for assessing an acquired mass spectrum obtained by a mass spectrometer, the system comprising a processor configured to perform the steps of claim 1.

* * * * *